United States Patent [19]

Lee et al.

[11] Patent Number: 4,773,035

[45] Date of Patent: Sep. 20, 1988

[54] PIPELINED DATA PROCESSING SYSTEM UTILIZING IDEAL FLOATING POINT EXECUTION CONDITION DETECTION

[75] Inventors: Hsiao-Peng S. Lee; Stephen J. Rawlinson, both of Sunnyvale; Stephen S. C. Si, Milpitas, all of Calif.

[73] Assignee: Amdahl Corporation, Sunnyvale, Calif.

[21] Appl. No.: 663,085

[22] Filed: Oct. 19, 1984

[51] Int. Cl.⁴ .................................... G06F 7/38
[52] U.S. Cl. ................................ 364/748; 364/736
[58] Field of Search ............... 364/748, 200 MS File, 364/736

[56] References Cited

U.S. PATENT DOCUMENTS

| | | | |
|---|---|---|---|
| 4,161,784 | 7/1979 | Cushing et al. | 364/748 |
| 4,390,946 | 6/1983 | Lane | 364/200 |
| 4,477,879 | 10/1984 | Wong | 364/748 |
| 4,528,640 | 7/1985 | Criswell | 364/748 |
| 4,534,010 | 8/1985 | Kobayashi et al. | 364/748 |
| 4,589,067 | 5/1986 | Porter et al. | 364/748 |
| 4,603,323 | 7/1986 | Hassitt et al. | 364/748 |
| 4,620,292 | 10/1986 | Hagiwara et al. | 364/748 |
| 4,649,508 | 3/1987 | Kanuma | 364/748 |
| 4,654,785 | 3/1987 | Nishiyama et al. | 364/748 |

*Primary Examiner*—Gary V. Harkcom
*Assistant Examiner*—Long Thanh Nguyen
*Attorney, Agent, or Firm*—Fliesler, Dubb, Meyer & Lovejoy

[57] ABSTRACT

An instruction execution unit receives instructions and, in turn, provides a sequence of control words to specify the sequential processing of the operand data provided with the instruction. A sequencer nominally issues a first sequence of control words corresponding to the instruction. The sequencer includes a sequence selector for selecting a second sequence of control words for issuance by the sequencer. Control logic is provided to determine from the operand data, concurrent with the issuance of at least the first issued control word, whether the operand data is ideal with respect to the instruction, where ideal is defined as the predicted nonoccurence of underflow and overflow conditions. On determining that the operand data is ideal with respect to the instruction, the sequence selector is caused to select the second sequence of control words for issuance.

20 Claims, 2 Drawing Sheets

FIG.-2

PIPELINED DATA PROCESSING SYSTEM UTILIZING IDEAL FLOATING POINT EXECUTION CONDITION DETECTION

CROSS REFERENCE TO RELATED APPLICATIONS (1) MULTIPLE MODULE CONTROL STORE FOR USE IN A DATA PROCESSING SYSTEM, Ser. No. 184,126 (AMDH3193DEL), invented by Amdahl et al, filed Sept. 4, 1980 and, abandoned, U.S. Pat. No. 4,587,611, issued May 6, 1986 assigned to the Assignee of the present invention.

(2) FLEXIBLE COMPUTER CONTROL UNIT, Ser. No. 525,745 (AMDH3916DEL), invented by Lee et al, filed Aug. 22, 1983 abandoned, U.S. Pat. No. 4,697,250, issued Sept. 29, 1987 and assigned to the Assignee of the present invention.

(3) CONTROL APPARATUS FOR A PIPELINED UNIT, Ser. No. 528,161 (AMDH3917DEL), filed Aug. 27, 1983, invented by Lee et al, abandoned U.S. Pat. No. 4,685,058, issued Aug. 4, 1987 and assigned to the Assignee of the present invention.

(4) ANCILLARY EXECUTION UNIT FOR A PIPELINED DATA PROCESSING SYSTEM, Ser. No. 662,966 (AMDH4681DEL/GBR), filed Oct. 19, 1984, invented by Lee et al U.S. Pat. No. 4,707,783, issued Nov. 17, 1987 and assigned to the Assignee of the present invention.

FIELD OF THE INVENTION

The present invention generally relates to high speed pipeline architecture data processing systems and, in particular, to a pipelined floating point execution unit utilizing ideal operand manipulation condition detection for the selection of optimal execution flow in the performance of certain floating point operations.

BACKGROUND OF THE INVENTION

High speed data processing systems are quite typically used in scientific applications. Applications, such as numerical modeling, require the execution of extensive numbers of floating point operations. Consequently, the speed of the system, particularly the execution speed of each floating point instruction, is a limiting factor in the utility of the data processing system.

Characteristically, high speed data processing systems are provided with high-speed hardware floating point units that directly perform such floating point operations as add, subtract, compare, and multiply. These systems typically utilize a pipelined architecture providing for a multistaged data flow that is controlled at each stage by its similarly staged instruction through the use of either micro-coded or hardwired control logic.

The multiple stage pipelined architecture allows multiple instructions to be processed generally one stage offset from one another thereby optimizing the utilization of available hardware. Each instruction will progress to a successive stage generally with each clock cycle and with its corresponding result data, assuming that the previous instruction either does not require or has completed any iterative cycling of the instruction within that stage.

The actual data flow through the pipelined architecture is controlled within each stage, for example, by micro-code stored in a control store table. This table is typically a memory device configured to act as a look-up table. The instruction itself acts as a key, or address pointer, into the control store table to select a corresponding micro-code control word. The control word, in turn, enables a specific data path through the stage's circuitry to perform the desired data manipulation function, such as normalizing a floating point operand word.

The bit width of an instruction, or the key portion thereof for a given stage, effectively determines the number of instructions that can be recognized at that particular stage. However, the bit width of the control store table and, therefore, the length of the micro-coded control word corresponding to a particular instruction may be of any desired length. Since each bit in the micro-coded control word can be used to control a particular functional aspect of its associated stage, the micro-code control store may have any desired width necessary to support the desired level of stage complexity and functionality. Accordingly, each stage may implement a substantial number of relatively independent functions substantially in parallel, thus minimizing the number of stages required to implement any given instruction. Thus, the instruction execution speed of pipelined architecture data processing systems is typically greater than comparable non-pipelined systems utilizing a similar number of execution stages.

Enhancements in the execution speed of such pipelined architecture systems is naturally desirable. However, the architectural designs for such machines, though varied as between different classes of machines, are generally well developed within each class. Thus, many enhancements of execution speed are obtained within a given class through the use of faster components and improved packaging and processing technology. This in turn, may require further optimizing of the architectural design of the system and, potentially, to the development of a new class of machines. Thus, while there remains room for improvement, the incremental advances in speed of execution are increasingly burdened by the cost and complexity of their implementation.

SUMMARY OF THE INVENTION

It is therefore a purpose of the present invention to provide for a substantial increase in the execution speed of floating point operations while retaining all the advantages of the prior art.

This is obtained in the present invention by utilizing an instruction execution unit comprising a primitive operator means for performing one or more floating point primitive operations on operand data including, but not limited to, addition and comparison. Each primitive operation is performed in a respective machine cycle. Sequencing means responsive to a given instruction is provided for directing the sequential execution of a plurality of primitive operations by the primitive operator means over a respective plurality of machine cycles so as to selectably perform floating point operations, including, but not limited to, addition, subtraction, comparison, and multiplication. The floating point operations typically include primitive operation cycles wherein non-ideal operand manipulation conditions of the data as sequenced is detected and dealt with. Determining means is provided for determining whether the data is ideal with respect to the given instruction. Finally, selector means associated with the sequencing means and responsive to the determining means is provided for selecting an alternate sequencing of the plurality of primitive operations by the sequencing means, wherein the non-ideal condition detecting primitive operations are effectively skipped, depending on the determination made by the determining means that ideal operand manipulation conditions exist.

Thus, a method of operating a floating point execution unit, comprising the steps of determining whether the operand data provided is ideal with respect to a given floating point operation, and effectively skipping that portion of the given floating point operation wherein the existence of a non-ideal manipulation condition is detected or handled, or both, is provided.

Consequently, an advantage of the present invention is that it provides for a substantial increase in the performance of a pipelined floating point execution unit while incurring no consequential disadvantages.

Another advantage of the present invention is that while only a few machine state cycles may be saved in the execution of a selected group of floating point operations, these operations generally are the ones most often utilized and that most often operate on data that conforms to the ideal manipulation condition criteria.

A further advantage of the present invention is that it is readily implemented in all floating point unit architectures and, in particular, those that utilize a pipelined architecture.

Still another advantage of the present invention is that it is implemented as a further parallel stage function and, therefore, does not extend the critical timing path length of its associated stage.

Yet another advantage of the present invention is that the additional circuitry, and power and dissipation requirements therefore, are minimal with respect to the floating point execution unit as a whole.

BRIEF DESCRIPTION OF THE DRAWINGS

Still other attendant advantages and further features of the present invention will become apparent and readily appreciated as the same becomes better understood by reference to the following detailed description when considered in connection with the accompanying drawings, in which like reference numerals designate like parts throughout the figures and wherein.

DETAILED DESCRIPTION OF THE INVENTION

Figure 1:
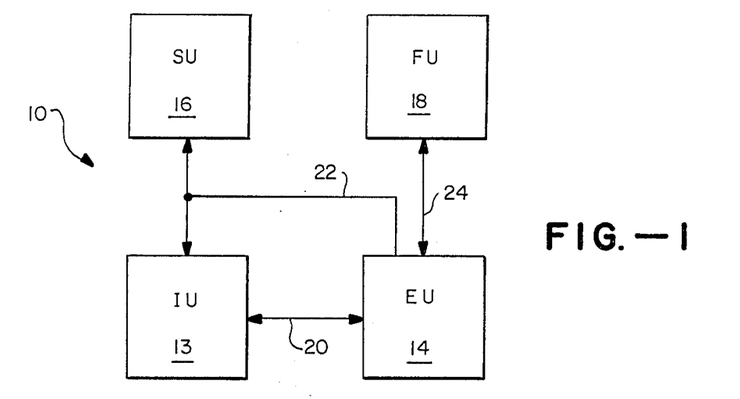
FIG. 1 provides a simplified block diagram of a data processing system consistent with the preferred embodiment of the present invention.

FIG. 1 provides a simplified block diagram for data processing system consistent with the preferred embodiment of the present invention. The data processing system 10 includes an instruction unit (IU) 12 interconnected with an execution unit (EU) 14 by a command/status bus 20 and a main memory storage unit (SU) 16 interconnected with both the IU 12 and EU 14 by a data bus 22. As shown, the data processing system 10 further includes an ancillary floating point unit (FU) 18 interconnected with the EU 14 by an FU interface bus 24. Data processing systems 10, to which the present invention is advantageously applied, typically includes only the IU 12, EU 14 and SU 16. The system 10 typically has a pipelined architecture having, typically and consistent with the preferred embodiment of the present invention, five pipelined stages. These stages may be identified and defined as follows:

(1) the G stage, wherein an instruction is passed from the IU 12 to the EU 14 over the command bus 20 and operand data from either the SU 16 or data registers present within the IU 12 is selected;

(2) the B stage, wherein the selected operand data is passed via the data bus 22 and latched to an operand word register (OWR) present within the EU 14;

(3) the L stage, wherein initial aspects of the execution of the instruction in the EU 14 occurs;

(4) the E stage, wherein the remaining aspects of the execution of the instruction occurs with the result thereof being loaded into a result register (RREG) at the end thereof; and (5) the W stage, wherein the result data from the RREG is passed or written back to an operand register in the IU 12 or to main storage in the SU 16.

TABLE I

| | | CYCLE | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| I | 1 | G | B | L | E | W | | | | | | | | | | |
| N | 2 | | G | B | L | E | E | E | E | W | | | | | | |
| S | 3 | | | G | B | B | B | B | L | E | E | W | | | | |
| T | 4 | | | | G | G | G | G | B | B | L | E | E | W | | |
| R | 5 | | | | | | G | G | B | B | L | E | W | | | |

The foregoing pipeline staging of instructions is conceptually illustrated in Table I. Instruction 1, requiring minimum execution, executes in machine cycles 1–5. Instruction 2 begins in cycle 2 as the G stage is freed of its responsibilities with regard to instruction 1. Instruction 2, for example being a functionally more extensive instruction than instruction 1, utilizes iterative cycling in the E stage during cycles 5–8 to algorithmically process the data therein. Accordingly, as the EU 14 is occupied with the execution of instruction 2, instruction 3 is delayed in the B stage until cycle 7. Instruction 3 enters and executes in the L stage during the last E stage cycle of instruction 3. Execution of instruction 3 then proceeds normally with, for example, a two-cycle E stage iteration. As instruction 3 was delayed in the B stage, instruction 4 is delayed first in the G stage, and then in the B stage awaiting availability of the correspondingly successive stages of the pipeline. Instruction 5, for example, being the same instruction as instruction 1, is similarly delayed in the G and B stages and, in comparison, requires seven cycles to complete. As should be readily apparent, the execution time of any given instruction is in large part dependent on the particular identity and sequencing of the immediately preceding instructions as well as the particular nature of the given instruction itself. It is therefore of utmost importance, with regard to the overall performance of the data processing system 10, to minimize as much as possible the number of iterative cycles within the E stage that any particular instruction requires in order to completely and properly execute.

The present invention provides for a significant reduction in the number of execution cycles required for the execution of certain floating point instructions. This is accomplished in the present invention by providing for a determination, depending on the instruction and the operand data provided, of whether certain criteria are met indicating that ideal numeric manipulation conditions will obtain during the execution of the instruction. That is, non-ideal numeric manipulation conditions encountered in such situations involving underflow, overflow and recomplementing will not occur. As is the invariably standard procedure in typical data processing systems, the condition of the current data, that is, whether a non-ideal condition exists and must be dealt with is determined following the floating point computation required by the instruction. In terms of the pipeline flow of the instructions, testing for the existence of non-ideal conditions will occupy or force the insertion of one or more E stage cycles prior to the W stage cycle. The present invention, by providing for an early determination of whether ideal conditions will obtain throughout the execution of the instruction permits the iterative execution of the instruction to be altered so as to omit or skip execution cycles that detect and appropriately handle non-ideal operand conditions. Thus, the execution speed of a floating point instruction, with regard to the preceding identity and sequencing of instructions and the operand data provided in conjunction with the present floating point instruction, may be significantly shortened.

Again, referring to FIG. 1, the data processing system 10, including the ancillary FU 18 consistent with the preferred embodiment of the present invention, is shown. As will be described in greater detail below, the FU 18 contains the necessary logic to perform all of the floating point instructions recognized by the IU 12 in functional equivalence to their performance by the EU 14. The FU 18 further includes the ideal numeric representation condition determining logic as necessary for the implementation of the present invention.

In order to effect the attachment and the complementary operation of the FU 18 with the EU 14, it is desirable to minimize the impact of the FU 18 on the pipelined nature of the data processing system 10. Accordingly, in the preferred embodiment of the present invention, the operation of the FU 18 is mapped onto the L and E stage cycles of the EU 14 by utilizing an intermediate T or operand transfer cycle and only a single pipeline stage FU 18 for the execution of a floating point operation in iterative F stage cycles.

and data input register (INREG) of the FU 18. During cycles 5 through 8, the operand data is processed in accordance with the corresponding floating point instruction in the FU 18 with the result being stored, for example, within the FU 18 in a result output register (OUTREG). Thus, the T and F stage cycles appear as L and E stage cycles to the rest of the system 10. In the W stage cycle, any data contained in the OUTREG of the FU 18 may be effectively ORed with forced zero data from the RREG of the EU 14 and stored, for example, in the main memory SU 16.

If, for example, instructions 3, 4, and 5 of Table II are of the same identity as their counterparts in Table 1, the utilization of the present invention, whereby a single E cycle iteration is saved through the use of the FU 18, becomes well apparent.

Figure 2:
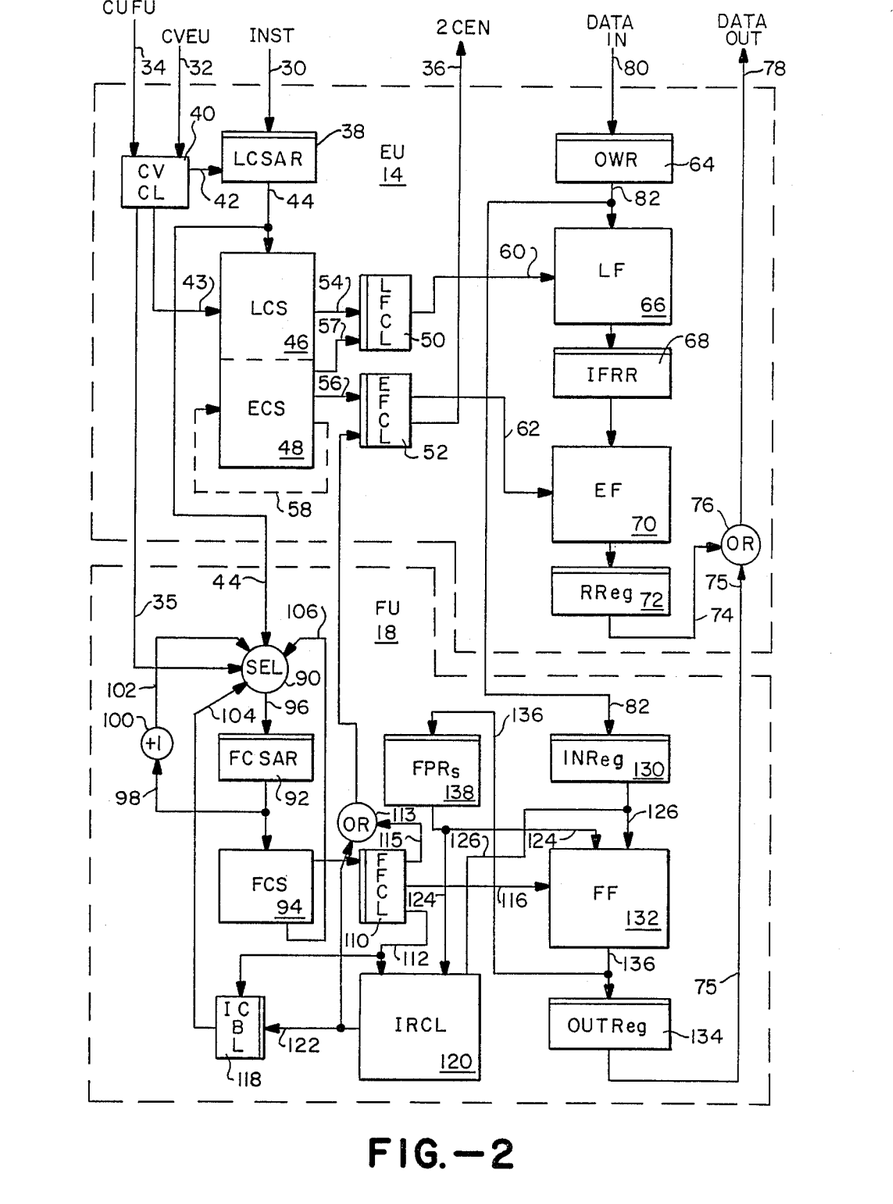
FIG. 2 provides a schematic block diagram illustrating the attachment of an ancillary floating point unit embodying the present invention to an execution unit of a pipelined data processing system.

The present invention, as embodied in its preferred embodiment, is shown in FIG. 2. The EU 14, as shown in FIG. 2 and described below, has been simplified so as not to obscure the present invention. A detailed description of the preferred structure and operation of the EU 14 is provided in the above-named related applications 1-3, those applications being expressly incorporated herein by reference.

Referring now to FIG. 2, the command/status bus 20 significantly includes an instruction bus (INST) 30, providing for the transfer of an instruction to the L control store address register (LCSAR) 38, and the handshaking lines command valid E unit (CVEU) 32 and command valid F unit (CVFU) 34, indicating that the data present on the INST bus 30 is a valid instruction and should be latched into LCSAR 38, and the two cycle early notice (2CEN) line 36 that provides an early notice signal two cycles in advance of the completion of the current instruction's use, or at least apparent use, of the EU 14. The data bus 22 includes the data in bus 80 providing operand data to the OWR 64 and the data out bus 78.

Briefly, the EU 14, in executing a given non-floating point instruction for example, is provided with the given instruction on the INST bus 30. The CVEU signal on line 32 is passed by the command valid control logic circuit (CVCL) 40 and provided on the latch control line 42 to the LCSAR 38 at the conclusion of the G stage cycle, whereby the instruction is latched into the LCSAR 38. In the next active B stage cycle, that is, active with respect to the present instruction,

TABLE II

| | | CYCLE | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| I | 1 | G | B | L | E | W | | | | | | | | | | |
| N | 2 | | G | B | L/T | E/F | E/F | E/F | W | | | | | | | |
| S | 3 | | | G | B | B | B | L | E | E | W | | | | | |
| T | 4 | | | | G | G | G | B | B | L | E | E | W | | | |
| | 5 | | | | | | | | G | B | B | L | E | W | | |

The complementary operation of the EU 14 and the FU 18 is illustrated in Table II. Instruction 1, for example, being a non-floating point instruction, executes substantially as before in the EU 14. Instruction 2, for example, being a floating point instruction, executes as before beginning in the G stage in cycle 2 and to the B stage in cycle 3. The B stage, however, further functions to provide the instruction passed to the EU 14 in the G stage to the FU 18. An apparent L stage cycle is then performed in cycle 4. However, instead of beginning the initial execution of the instruction, the operand data is passed from the OWR of the EU 14 to the operoperand data is provided on the data in bus 80 to the OWR 64. This data is latched in at the conclusion of the B stage cycle. Also during the B stage cycle, the instruction maintained in the LCSAR 38 is translated by the L control store (LCS) 46 into a control word, as enabled by an ordinary operation enable signal from the CVCL 40 on line 43, and provided on the bus 54 to the L facility control word latch (LFCL) 50. The control word is latched in at the beginning of the next active L stage cycle.

The latched control word provides for the operational configuration of the L facility (LF) 66 via the control word lines 60 during the L stage cycle. The data resulting from the preliminary processing of the operand data in the LF 66 is latched into the inter-facility result register (IFRR) 68 at the conclusion of the L stage cycle.

During the L stage cycle of the instruction, the E control store (ECS) 48, in combination with the LCS 46, further translates the instruction stored in the LCSAR 38 into a E facility control word that is provided via the bus 56 to the E facility control latch (EFCL) 52. This results in the E facility control word being latched and available in the EFCL 52 at the beginning of the next active E stage cycle. The E facility control word is provided by the bus 62 to the E facility (EF) 70, whereby the EF 70 is appropriately configured for the processing of data in view of the instruction initially stored in the LCSAR 38.

In the simplest case, the L facility result data from the IFRR 68 is processed by the EF 70 and latched into the RREG 72 in a single E stage cycle. For more complex instructions, operand data may be algorithmically transformed in the EF 70 and, selectably, in the LF 66 controlled by the ECS 48 through the LFCL 50 (indicated by the control word bus 57) through an iterative sequence of E stage cycles. The specific iterative sequence is determined by the initial control word of the ECS 48 as indirectly pointed to by the instruction stored in the LCSAR 38. That is, a portion of the control word pointed by the LCSAR 38 pointer forms the key pointer into the ECS 48 and is similarly stored in an E control store address register (ECSAR), not shown. The immediately subsequent control words in the ECS 48, relative to the control word key in the ECSAR, effectively define the sequence of steps, or a portion thereof, required to implement the algorithm. These control words may be accessed generally by incrementing the ECSAR key pointer into the ECS 48. This sequencing capability, as well as that of branching to sequence other sections of the ECS 48, is generally indicated by the iterative control bus 58. Though simplified here, this functionality is disclosed in detail in the above-noted related application, "Control Apparatus for a Pipelined Unit".

Regardless of the particular iterative sequencing path followed through the ECS 48 and, therefore, the algorithmic processing of data within the EF 70, the process will approach its natural termination. Three cycles prior to this termination, the ECS 48 will further provide a control bit on the bus 56 to the EFCL 52, that, in turn, provides the two-cycle early notice signal on the 2CEN line 36. This signal is required to alert the IU 12 that the E facility will be available to begin processing the next instruction during the second full cycle following issuance of the 2CEN signal. During the remaining cycle that the EU 14 is occupied by the current instruction, the algorithmic processing of the data in the EF 70 is completed with the result being latched into the RREG 72. Finally, this result data may then be moved during the W stage cycle to the data out bus 78.

The FU 18 interfaces essentially solely to the EU 14 such that its presence and operation are effectively transparent to the remainder of the data processing system 10. This is accomplished in the FU 18 by mirroring the data processing functionality of the EU 14 relevant to the performance of floating point operations by mapping the execution of floating point operations as well as the necessary communication between the EU 14 and the FU 18 onto the normal pipeline stage cycles of the EU 14 operation.

Accordingly, during the execution of the G stage cycle of a floating point operation, the command valid signal from the IU 12 will be provided on the command CVFU line 34 instead of the CVEU line 32. By the operation of the CVCL 40, the latch signal is again provided on the latch control line 42 to the LCSAR 38, thereby latching in the floating point instruction on the INST bus 30. During the B stage cycle, the instruction held in the LCSAR 38 will be passed by the ancillary instruction bus 44 to the FU 18. The CVCL 40, rather than providing an ordinary instruction enable signal to the LCS 46, provides a floating point instruction select signal via line 35 to the selector circuit 90 and, accordingly, selects the new instruction to be loaded in from the instruction bus 44. The F control store address register (FCSAR) 92 latches in the instruction provided by the selector circuit 90 via the bus 96 at the end of the B stage cycle. This instruction, acting as a control store address pointer, is thus provided on the F control store address bus 98 to the F control store (FCS) 94. It is also provided to the incrementor circuit 100 that effectively returns the F control store address, incremented by one, to the selector circuit 90 via the increment bus 102. The FCS 94 translates the F control store address into a F control word that is provided to the F facility control latch (FFCL) 110 and, additionally, a branch address that is provided on the sequence branch address bus 106 to the selector circuit 90.

At the beginning of the next active L cycle, operand word data provided on the data in bus 80 during the preceding B stage cycle is latched into the OWR 64 of the EU 14. The operand word data is thus available via the operand word data bus 82 to the FU input register (INREG) 130 where it is latched at the end of the L stage cycle. By the nature of this stage cycle with respect to the FU 18, it may be termed a transfer or T stage cycle. At the beginning of the next active E stage cycle, or F stage cycle with respect to the FU 18, the F control word is translated from the instruction held in the FCSAR 92 and latched into the FFCL 110. Thus, during the F stage cycle the F control word is passed to the F facility (FF) 132 over the F control word bus 116 to establish the operative configuration of the FF 132. Also during the F stage cycle, operand word data from the INREG 130 is provided in parallel with operand word data derived from a bank of floating point registers (FPRs) 138 on their respective word data bus lines 126, 124. As in the EU 14 with regard to the EF 70, the FF 132 may algorithmically process the operand word data provided to it over an iterative sequence of F stage cycles. The resultant data is provided to either the FPRs 138 or the output register (OUTREG) 134, or both, depending on the particular floating point operation, via the F facility resultant data bus 136. In any case, the resultant data is latched into its destination at the conclusion of the last F cycle.

Where data is to be returned from the FU 18 to the remainder of the data processing system 10, the data present in the OUTREG 134 is passed via the F unit data out bus 75 to an OR gate 76 of the EU 14. The OR gate 76 combines the output of the RREG 72 and the OUTREG 134 to provide output data on the data out bus 78 during the W stage cycle of both the EU 14 and the FU 18.

By providing that the RREG 72 contains all zero data, the output data from the OUTREG 134 alone is provided on the data out bus 78. This may be accomplished in a variety of ways including clearing the RREG 72 to all zero data in response to the CVFU signal. Preferably, however, the absence of the ordinary instruction enable signal, in view of the instruction in the LCSAR 38, on line 43 effectively directs the LCS 46 and, subsequently, the ECS 48 to execute so as to load the RREG 72 with all zero data from the EF 70. This capability has the further advantage of allowing the EU 14 to generate the 2CEN signal when the FU 18 instruction execution is too short, in terms of cycles, to allow the FU 18 to provide the 3CEN signal at its proper time.

The iterative cycling of the FF 132 to algorithmically process data is obtained by providing appropriate sequences of control words in the FCS 94 corresponding to the data path configuration of the FF 132 required for the desired algorithmic processing. That is, the instruction initially provided in the FCSAR 92 acts as an address pointer to the beginning of the corresponding algorithm in the FCS 94 control word look-up table. A portion of the control word residing at the address pointed to by the FCSAR 92 address pointer is returned to the selector circuit 90 as a branch address pointer. The address pointer of FCSAR 92 is also returned, though incremented by one, to the selector circuit 90. In addition, the selector circuit 90 also receives condition signals generated within the FU 18 as inputs. These condition signals are typically provided to reflect any particular condition, such as underflow, overflow and negative result, as detected by the FF 132 during a previous F stage cycle. The selector circuit 90, depending on condition select bits, such as branch unconditionally, branch on the detection of a certain condition, or continue sequentially from the current address pointer, will select a new FCS address pointer. These condition select bits are provided along with the branch address from the FCS 94 to the selector circuit 90. Thus, either the once incremented address pointer or the branch address, as provided on lines 102 and 106, respectively, is passed by the selector circuit 90 via the selected address pointer bus 96 to the FCSAR 92 wherein it is latched at the beginning of the next active F stage cycle. Consequently, an instruction can invoke a micro-code microprogram ranging from as simple as a single control word to a complex algorithm containing multiple conditional branch points.

In accordance with the present invention, an additional condition signal is provided for via the condition line 104 for determining whether or not the current branch address as provided on line 106 will be selected by the selector circuit 90. This condition signal is ultimately generated by the ideal representational condition logic circuit (IRCL) 120. The IRCL 120 takes as its input the operand word data provided in parallel from the FPRs 138 and the INREG 130 via their respective busses 124, 126. As will be explained in greater detail below, the IRCL 120 operates to determine whether ideal numeric manipulation conditions will obtain throughout the remainder of the algorithmic processing of the operand word data in view of the floating point instruction being executed. This latter information is provided by a portion of the control word latched in the FFCL 110 which is routed via bus 112 to the IRCL 120. Should the IRCL 120 determine conclusively that ideal numeric manipulation conditions will obtain throughout the algorithmic processing of the operand word data initially provided to the FF 132, then an ideal condition signal is provided on the line 122 to the ideal condition buffer latch (ICBL) 118. The ICBL 118, in response to a latch enable control signal provided over bus 112 as determined by the current control word latched in the FFCL 110, immediately makes the ideal condition signal available to the selector circuit 90 over line 104. The ICBL latches the ideal condition signal state at the end of the current F stage cycle as the latch enable signal is removed by the changing of control words. Thus, the state of the ideal condition signal may be tested during subsequent F stage cycles.

As will be described in greater detail below by example, the decision point at which the ideal representational condition determination is made is dependent on the algorithmic processing dictated by the current instruction being executed in the FU 18. Thus, as the decision point is encountered in the algorithmic processing of the operand word data in the FF 132, the associated control word sourced by the FCS 94 and latched into the FFCL 110 will provide the latch enable control signal on a line of bus 112 to the ICBL 118 allowing its state to change to reflect the decision point state of the ideal manipulation condition signal on line 122. Consequently, by providing the ideal condition signal and, further, latching the signal for use in subsequent F stage cycles, the microprogram floating point algorithms may test and accordingly branch to execute the instruction in the shortest number of cycles. That is, the algorithm may include an ideal representation condition microprogram execution branch path that does not further test or act to handle non-ideal manipulation conditions. Thus, one or more F stage cycles may be saved relative to the algorithm's worst case condition branch path followed for dealing with potentially non-ideal manipulation conditions.

Considering the timing requirements of the preferred embodiment of the present invention, the only restriction placed on the selection of a decision point is that it must allow for the proper issuance of the 3CEN signal. That is, the decision point must be implemented in or prior to the third full cycle before the execution of the instruction along the ideal condition branch will terminate. Naturally in other embodiments, should only a 2CEN be required, the decision point can be as late as the second full cycle prior to the end of the ideal condition branch path.

Finally, in order to coordinate the operation of the FU 18 with the EU 14, particularly in view of the provision of the IRCL 120, the FU 18 provides a signal on the three cycle early notice line (3CEN) 114, indicating that the FU 18 will be available to begin processing the next instruction, if necessary, in the third full cycle following the current F stage cycle. The 3CEN signal provided by the FU 18 is sourced by the IRCL 120 during the decision point cycle or appropriately provided by the control word latched in the FFCL 110 via the bit line 115 when the algorithmic processing of the operand word data follows the potentially non-ideal condition algorithmic branch path. This also allows the FU 18 to execute floating point instructions that, for whatever reason, are not implemented with a conditional ideal condition detection branch. In any case, the OR gate 113 appropriately permits either source of the 3CEN signal to assert it on line 114. The 3CEN signal is effectively latched into the EFCL 52 of the EU 14 at the end of the current E/F stage cycle and subsequently provided to the IU 12 as the 2CEN signal during the next active E/F stage cycle.

In order to further appreciate the application and operation of the present invention, reference is now made to Tables III through X. Note that Tables III through V describe, in terms of the functions performed during each cycle, the function of a typical execution unit without the functional capabilities of the present invention as necessary for performing floating point addition and subtraction, comparison, and multiplication. The algorithms provided by these tables are exemplary of the micro-coded algorithms utilized in typical data processing systems 10 that further typically conform to the Principles of Operation (hereinafter POO) of the IBM System/370 as set forth in the Principals Of Operation, Document GA22-7000-8, 10th Edition, May 1983, International Business Machines Corporation, which is accordingly expressly incorporated herein by reference.

As described by the POO and in accordance with the preferred embodiment of the present invention, the binary representation format of short floating point numbers is as a 32-bit word, wherein bit 0 is a sign bit, the exponent is represented by a 7-bit binary number taken from bits 1-7, and the remainder of the floating point word, bits 8-31, form a 6 hexadecimal- digit fraction. Optionally, a long floating point format may be used, wherein a double word width is utilized to allow for a fraction having 14 hexadecimal digits extending between bits 8 and 63. The choice of long or short format is explicitly specified as part of each floating point instruction.

TABLE III
FLOATING POINT ADDITION AND SUBTRACTION

| Cycle | Function |
| --- | --- |
| (1) | Compare the exponents and align the fractions. |
| (2) | Add or subtract the fractions. If subtracting, subtract the shifted fraction from the unshifted fraction. Use the sign of the unshifted fraction as the predicted result sign. If the sign is selected from operand 2 and the instruction specifies subtraction, then use the complement of the operand 2 sign as the predicted result sign. If neither operand is shifted (because the exponents are equal), then treat the operand with the smaller leading fraction digit as the shifted operand. If the exponents are equal and the leading fraction digit of each fraction is equal, then make an arbitrary selection between the operands for treatment as the shifted operand. |
| (3) | Test if the result of the addition or subtraction in Step 2 is zero; if in Step 2 the fractions were subtracted with a negative result, then recomplement the result fraction and invert the predicted result sign. |
| (4) | Test for exponent underflow if the result is not zero; decrement the exponent by the number of leading zero digits in the result fraction. |
| (5) | Set the condition code; restore the exponent to its original value if the result is zero; test the significance mask if the result is zero. Send out 2CEN. |
| (6) | Normalize the fraction, adjust exponent if necessary, and store the result; if there are any exception conditions, then assert a program interruption. Send out condition code. (End of instruction execution). |

TABLE IV
FLOATING POINT COMPARISON

| Cycle | Function |
| --- | --- |
| (1) | Compare the exponents and align the fractions. |
| (2) | Add or subtract the fractions. If the signs are equal, then subtract; if the signs differ, then add. If subtracting, subtract the shifted fraction from the unshifted fraction. Use the sign of the unshifted fraction as the predicted result sign. (If the unshifted fraction is from operand 2, then use the complement of the operand 2 sign as the predicted result sign.) |
| (3) | Set the condition code based upon the result from Step 2. Send out 2CEN. |
| (4) | Send out condition code. (End of instruction execution) |

TABLE V
FLOATING POINT MULTIPLICATION CYCLE

| Cycle Long | Cycle Short | Function |
| --- | --- | --- |
| 1-5 | 1-2 | Multiply the fractions producing two results: "sum" and "carry". These two results have to be added together in order to obtain the intermediate product fraction. This step takes 5 cycles for long multiplication and 2 cycles for short multiplication. During this step, the intermediate product exponent and sign are also generated. |
| 6 | 3 | Add the "sum" and "carry" to form the intermediate product fraction. |
| 7 | 4 | Test for zero, exponent underflow, or exponent overflow. Send out 2CEN |
| 8 | 5 | Normalize the fraction, adjust exponent if necessary, and store the result; if there are any exception conditions, then assert a program interruption. (End of instruction execution) |

The present invention provides for the early determination of whether the immediately post computation operand data produced by a floating point operation, such as addition, subtraction, compare, or multiply, will require further manipulation to provide the proper resultant operand data for the instruction, as specified by the POO in view of its initial operand data. By specifically providing for this determination, for example, in cycle 1 of the algorithm presented in Table III and if the result of this determination is that the immediately post computational result will not require further manipulation, that is, the operands are ideal with respect to the instruction, then the functions performed in cycles 3, 4, and the second part of 5 can be simply skipped in the execution of the instruction. Further, the remaining functions provided during cycle 5 may be performed during cycle 2. Thus, as shown in Table VIII, the number of required execution cycles can be reduced from 6 to 3, for ideal conditions, and still correctly implement the floating point addition or subtraction operation.

Similarly, in the floating point comparison algorithm provided in Table IV, if a similar determination of whether ideal representational conditions will obtain throughout the execution of the floating point comparison instruction can be made during cycle 1 thereof, then the portions of step 2 could be skipped. Consequently, as indicated in Table IX, the condition code setting function of cycle 3 could be merged with the functions of cycle 2, thereby shortening the required number of execution cycles from four to three.

Again, considering the floating point multiplication algorithm presented in Table V, the function of cycle 4 for short format floating point multiplication or cycle 7 for long format floating point multiplication can be skipped by determining prior to cycle 4 or 7, respectively, whether the result of the floating point multiplication will be zero or incur an overflowed or underflowed exponent. Consequently, in either case as indicated in Table X, one execution cycle may be saved depending on whether it can be determined from the initial operand data supplied with the floating point multiplication instruction as to whether ideal conditions will obtain throughout the execution of the instruction.

Tables VI and VII provide the comprehensive criteria that may be considered in determining from the initial operand word data provided with a floating point instruction whether the ideal representation conditions will obtain throughout the execution of that particular instruction.

TABLE VI

IDEAL FLOATING POINT ADD, SUBTRACT AND COMPARE CONDITIONS

Ideal floating point conditions tested in the execution of floating point add, subtract, and compare instructions. The conditions tested are:

(1) Recomplementing will not happen. This condition is met if any of the following conditions are true:
   (a) The operand fractions are added.
   (b) The operand with the larger magnitude is normalized, and the exponents are unequal. (The operand with the larger magnitude is normalized if the operand with the larger exponent is normalized or if the exponents are equal and either operand is normalized.)
   (c) The operand with the larger magnitude is normalized, and the leading digit of each operand fraction is unequal.
(2) The result will not be zero. This condition is met if any of the following conditions are true:
   (a) The operand fractions are added and the operand with the larger magnitude is not zero.
   (b) The operand with the larger magnitude is normalized, and the exponents are unequal.
   (c) The operand with the larger magnitude is normalized, and the leading digit of each operand fraction is unequal.
(3) The result will not have an exponent underflow. This conditions is met if any of the following conditions are true:
   (a) The operand fractions are added and the operand with the larger magnitude is normalized.
   (b) The operand with the larger magnitude is normalized; the exponents are unequal; and the larger exponent has a value of at least '10' hexadecimal.
   (c) The operand with the larger magnitude is normalized; the leading digit of each operand fraction is unequal; and the larger exponent has a value of at least '10' hexadecimal.
(4) The result will not have an exponent overflow. This test is not necessary for compare. This condition is met if the operand fractions are subtracted or if both exponents have a value that is less than '7F' hexadecimal.

TABLE VII

IDEAL FLOATING POINT MULTIPLY CONDITIONS

The conditions tested are:

(1) The intermediate product will not be zero. This condition is met if both fractions are not zero.
(2) The result will not have an exponent underflow. This condition is met if both operands are normalized and the current exponent sum is at least '41' hexadecimal.
(3) The result will not have an exponent overflow. This condition is met if the current exponent sum is less than 'C0' hexadecimal.

Consistent with the implementation of the preferred embodiment of the present invention, the comprehensive criteria set forth in Tables VI and VII can be reduced by electing the implementation of only the more restrictive criteria. That is, for example with respect to Table VI, the comprehensive criteria set forth as condition 3 inherently requires that conditions 1 and 2, as set forth therein, will be met along with a few additional restrictions. Since these conditions may be tested in the alternative with regard to whether ideal representation conditions exists, limiting the testing to that for conditions 3 and 4 is more restrictive than necessary in determining whether ideal representation conditions exist. However, this is adequately offset by the ease of implementation, reduced circuitry involved, and less area that the ideal representation condition logic circuit requires in order to be implemented, at least in the preferred embodiment of the present invention.

Additionally, the preferred embodiment of the present invention utilizes the same ideal condition detection criteria as for floating point add and subtract operations to determine whether ideal floating point representation conditions will obtain throughout floating point comparison operations. Though the use of these determining criteria are again more restrictive than necessary for a floating point comparison operation, the trade off, as above, is considered appropriate in the implementation of the preferred embodiment of the present invention.

Also similar to the implementation of the ideal floating point add and subtract operation criteria, the ideal floating point multiply condition criteria implemented in the preferred embodiment of the present invention concern only conditions 2 and 3 of Table VII. This again is the optimal trade off considering that the condition tested by criteria 1 of Table VII must be fulfilled under criteria 2. Thus, while more restrictive than necessary, the trade off is made for the reasons given above in the preferred embodiment of the present invention.

In view of the foregoing, the algorithms of Tables III, IV, and V can be modified to allow for ideal condition detection as provided in corresponding Tables VIII, IX, and X.

TABLE VIII

FLOATING POINT ADDITION AND SUBTRACTION

| Cycle | Function |
|---|---|
| (1) | Compare the exponents and align the fractions. Decision point: determine if ideal condition criteria are met, enable IBCL to store result. Send out 3CEN if ideal condition is indicated. |
| (2) | Add or subtract the fractions. If subtracting, subtract the shifted fraction from the unshifted fraction. Use the sign of the unshifted fraction as the predicted result sign. If the sign is selected from operand 2 and the instruction specifies subtraction, then use the complement of the operand 2 sign as the predicted result sign. If neither operand is shifted (because the exponents are equal), then treat the operand with the smaller leading fraction digit as the shifted operand. If the exponents are equal and the leading fraction digit of each fraction is equal, then make an arbitrary selection between the operands for treatment as the shifted operand. Set the condition code if ideal condition is indicated by ICBL and then go to cycle 3b. |
| (3a) | Test if the result of the addition or subtraction in Step 2 is zero; if in Step 2 the fractions were subtracted with a negative result, then recomplement the result fraction and invert the predicted result sign. |
| (4a) | Test for exponent underflow if the result is not zero; decrement the exponent by the number of leading zero digits in the result fraction. Send |

TABLE VIII-continued
FLOATING POINT ADDITION AND SUBTRACTION

| Cycle | Function |
|---|---|
| | out 3CEN. |
| (5a) | Set the condition code; restore the exponent to its original value if the result is zero; test the significance mask if the result is zero. |
| (6a) | Normalize the fraction, adjust exponent if necessary, and store the result; if there are any exception conditions, then assert a program interruption. Send out condition code. (End of instruction execution) |
| (3b) | Normalize the fraction, adjust exponent if necessary, and store the results. Send out the condition code. (End of instruction execution) |

TABLE IX
FLOATING POINT COMPARISON

| Cycle | Function |
|---|---|
| (1) | Compare the exponents and align the fractions. Decision point: determine if ideal condition criteria are met; enable ICBL to store result. Send out 3CEN if ideal condition is indicated. |
| (2) | Add or subtract the fractions. If the signs are equal, then subtract; if the signs differ, then add. If subtracting, subtract the shifted fraction from the unshifted fraction. Use the sign of the unshifted fraction as the predicted result sign. (If the unshifted fraction is from operand 2 and the instruction specifies subtraction, then use the complement of the operand 2 sign as the predicted result sign.) Set the condition code if ideal condition is indicated by ICBL and then go to cycle 3b. If not ideal condition indicated by ICBL, then send out 3CEN. |
| (3a) | Set the condition code based upon the result from Step 2. |
| (4a) | Send out condition code. (End of instruction execution) |
| (3b) | Send out condition code. (End of instruction execution) |

TABLE X
FLOATING POINT MULTIPLICATION

| Cycle | | Function |
|---|---|---|
| Long | Short | |
| (1a–5a) | (1b–2b) | Multiply the fractions producing two results: "sum" and "carry". These two results have to be added together in order to obtain the intermediate product fraction. This step takes 5 cycles for long multiplication and 2 cycles for short multiplication. Decision point: (cycle 2 for short, cycle 5 for long) determine if ideal condition criteria are met; enable ICBL to store the result. Send out 3CEN if ideal condition is indicated. Generate the intermediate product exponent and sign. |
| (6a) | (3b) | Add the "sum" and "carry" to form the intermediate product fraction. If ideal condition is indicated by ICBL, go to cycle 7c/4d. If not ideal condition indicated, then send out 3CEN. |
| (7a) | (4b) | Test for zero, exponent underflow, or exponent overflow. |
| (8a) | (5b) | Normalize the fraction, adjust exponent if necessary, and store the result; if there are any exception conditions, then assert a program interruption. (End of instruction execution) |
| (7c) | (4d) | Normalize the fraction, adjust exponent if necessary, and store the result. (End of instruction execution) |

Figure 3:
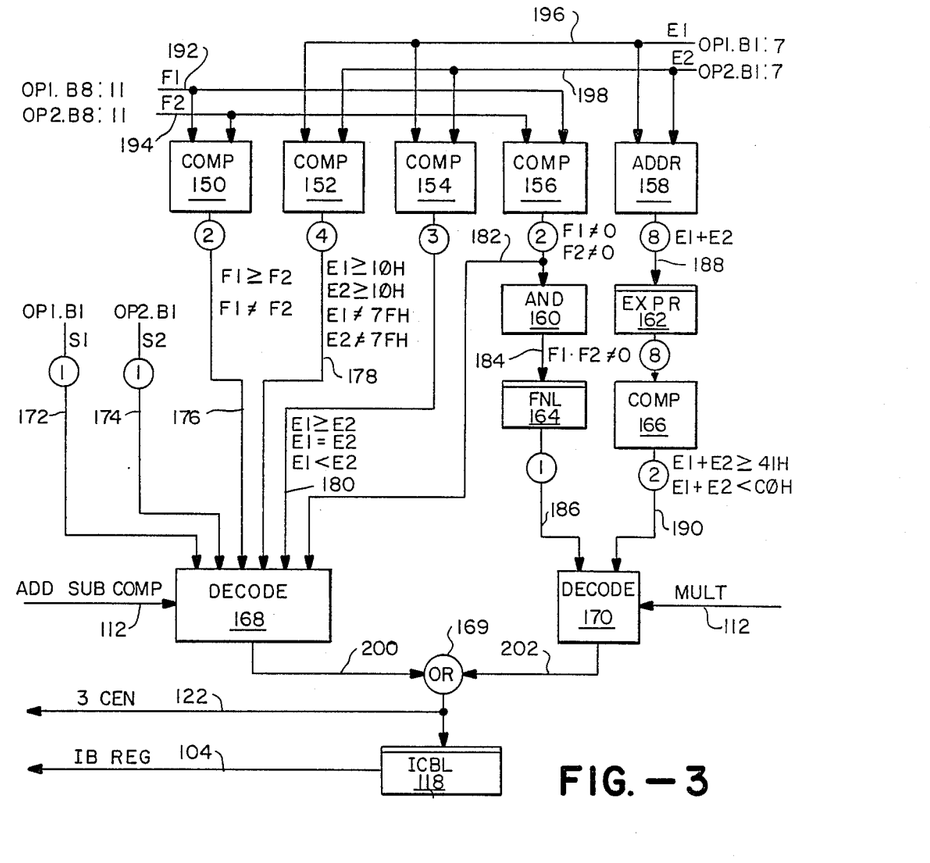
FIG. 3 provides a schematic block diagram of the ideal operand manipulation condition detection logic as utilized in the preferred embodiment of the present invention.

Referring now to FIG. 3, a schematic block diagram of the preferred implementation of the IRCL 120 of FIG. 2 is shown. The operand word data bus 126 from the INREG 130 is shown in FIG. 3 as being comprised of the sign bit (S1) 172, the exponent bit lines (E1) 196 and the first nibble or four bit lines (F1) 192 of the first operand word fraction. Similarly, the floating point operand word data bus 124 as shown in FIG. 3 is comprised of the sign bit line (S2) 174, the exponent bit lines 198 (E2), and the first nibble bit lines (F2) 194 of the second operand word fraction. Note that the fraction nibbles F1 and F2, respectively, provide the most significant hexadecimal digit place of the respective fractions. As shown, the fractions F1 and F2 are compared by the comparator 150 to provide two outputs indicating that F1 is greater than or equal to F2 and that F1 is not equal to F2, respectively. Comparator 156 also compares the fractions F1 and F2, but independently against the value zero to provide two signal lines 182 indicating F1 not equal to zero and F2 not equal to zero, respectively.

The exponents E1 and E2 are compared by comparator 152, each against the values 10 hexadecimal and 7F hexadecimal to provide four condition signals on lines indicated as 178 indicating E1 greater than or equal to 10 hexadecimal, E2 greater than or equal to 10 hexadecimal, E1 equal to '7F' hexadecimal, and E2 equal to '7F' hexadecimal. Comparator 154 compares the exponents E1, E2 against one another to produce three condition signals on lines 180 indicating E1 greater than or equal to E2, E1 equal E2, and E1 less than E2. Finally, the exponents E1, E2 are summed by the adder 158 to provide the binary sum, including the carry bit therefrom, on eight bit lines 188.

The various outputs 176, 178, 180, 182 of the comparators 150, 152, 154, 156, respectively, are provided to the decoder circuit 168 along with both sign bits S1, S2 on lines 172, 174, respectively. The decoder circuit 168 is further provided with a number of signals on its respective portion of the IRCL control bus 112. These signals indicate whether the current instruction being executed is subject to ideal representation condition determination testing and whether it is an appropriate addition, subtraction, or comparison operation. Accordingly, the decoder 168 will combine the various input signals thereto and appropriately provide on output line 200 a signal indicating whether the criteria of conditions 3 and 4 of Table VI are fulfilled in view of the nature of the current instruction. Naturally, should the instruction not be subject to ideal representation condition testing or not be an add, subtract, or comparison instruction, then the decoder 168 will provide an output signal on line 200 indicating that ideal conditions have not been detected.

Preferably the decoder 168 is a two-stage AND-OR logic block. In order to decode the necessary criteria for the evaluation of conditions 3 and 4 of Table VI, the decoder 168 implements the logic formula provided by equation 1, as supported by equations 2-11, wherein the symbol "+" indicates a logical OR and wherein the symbol "°" indicates a logical AND.

$$\text{Ideal } ASC = C_3 \cdot C_4, \qquad \text{Eq. 1}$$

where:

$$C_3 = C_{3a} + C_{3b} + C_{3c} \qquad \text{Eq. 2}$$

$$C_{3a} = \text{ADD} \cdot LMN \qquad \text{Eq. 3}$$

$$C_{3b} = LMN \cdot [((\overline{E1 < E2}) \cdot (E2 \geq '10'H)) + \qquad \text{Eq. 4}$$

-continued $$((E1 \geq E2) \quad (E1=E2) \quad (E1 \geq '10'H))]$$

$$C_{3c} = LMN \quad (E1=E2) \quad (E1 \geq '10'H) \quad (F1 \neq F2) \qquad \text{Eq. 5}$$

$$C_4 = Sub + [(E1 \neq '7F'H) \quad (E2 \neq '7F'H)] \qquad \text{Eq. 6}$$

$$LMN = [(F1 \neq 0) \quad (E1 > E2)] + [(F2 \neq 0) \quad (E1 < E2)] + \qquad \text{Eq. 7}$$
$$[(F2 \neq 0) \quad (E1 = E2)]$$

$$Add = [(AI \quad S1 \quad S2) + (AI \quad S1 \quad S2) + \qquad \text{Eq. 8}$$
$$(\overline{SI} \quad S1 \quad S2) + (\overline{SI} \quad S1 \quad S2)$$

$$Sub = [(SI \quad S1 \quad S2) + (SI \quad S1 \quad S2) + \qquad \text{Eq. 9}$$
$$(AI \quad S1 \quad S2) + (AI \quad S1 \quad S2)$$

$$AI = \text{add instruction} \qquad \text{Eq. 10}$$

$$SI = \text{substract or compare instruction} \qquad \text{Eq. 11}$$

The outputs of the comparator 156 on lines 182 are ANDed by the AND gate 160 to provide a signal on line 184 indicating the state of the product of F1 and F2. This product is passed to a fraction normalized latch (FNL) 164 where it may be appropriately latched for subsequent use. The FNL 164 further passes the fraction product status, indicative of whether both fractions are normalized to the decoder 170 on line 186.

The sum of the exponents E1 and E2 is passed over the bus 188 to the exponent register 162 where it may be latched for subsequent use. The sum is further passed to the comparator 166 wherein it is independently compared to the values '41' hex and 'C0' hex to provide respective signals to the decoder 170 over the lines 190.

Similar to the decoder 168, the decoder 170 receives control signals over a portion of the ideal representation condition control bus 112 indicating whether the current instruction is subject to ideal representation condition testing, and, further, is an appropriate long or short format multiplication instruction. The decoder 170 is preferably a two-stage AND-OR logic block implementing equation 12 as supported by equations 13 and 14. Thus, the decoder 170 provides an ideal multiplication representation condition signal on line 202 when the criteria of conditions 2 and 3 of Table VII are met.

$$\text{Ideal Mult.} = C_2 \cdot C_3, \qquad \text{Eq. 12}$$

where:

$$C_2 = (F1 \neq 0) \cdot (F2 \neq 0) \cdot ((E1 + E2) \geq '41'H) \qquad \text{Eq. 13}$$

$$C_3 = (E1 + E2) < 'C0'H \qquad \text{Eq. 14}$$

The output signals of the decoders 168 and 170 are provided to the OR gate 169 to further provide the 3CEN signal on line 122 in accordance with equation 15. The signal on line 122 is also provided to ICBL 118.

$$3CEN = \text{Ideal } ASC + \text{Ideal Mult.} \qquad \text{Eq. 15}$$

Thus, both apparatus and method for implementing a pipelined floating point execution unit utilizing ideal condition detection, wherein certain floating point operations may be optimized in terms of reducing their required number of execution cycles, has been described. Although the required number of execution cycles for each instruction is reduced by only a very few number of cycles under ideal conditions, the rate of occurrence of ideal conditions with respect to these instructions is expected to be quite high. In most circumstances ideal conditions should be met for the relevant add, subtract, and compare instructions, at least approximately 90 percent of their occurrence. For long and short format multiplication instructions, the expected rate of ideal condition occurrence should be at least approximately 70 percent. Consequently, implementation of the present invention under most circumstances will yield a substantial improvement in the overall execution speed of the data processing system in which it is utilized.

While the invention has been particularly shown and described with reference to the preferred embodiment thereof, it will be understood by those skilled in the art that many modifications and variations of the present invention are possible and readily appreciated in light of the above description of the invention. It is contemplated that these modifications may include changes in the form and detail of the implementation of the invention whereby ideal representation conditions are determined based on greater or lesser sets of criteria for the floating point instructions described above, as well as other floating point instructions that are similar, such as, but not limited to, load rounded, hall (POO specified instruction for division by two), division, and L conversion from one floating point format to another. A variation contemplated is the application of the present invention to data processing systems that execute floating point instructions but do not maintain their floating point numbers in the format specified by the POO. It is therefore to be understood that, within the scope of the appended claims, the invention may be practiced otherwise than as specifically described.

What is claimed is:

1. An instruction execution unit responsive to an instruction for providing a sequence of microcode control words to direct the processing of operand data associated with said instruction, said instruction execution unit comprising:
   (a) sequencing means, responsive to said instruction, for issuing first and second sequences of microcode control words corresponding to said instruction, said sequencing means including selector means for selecting said first or said second sequence of microcode control words for issuance by said sequencing means; and
   (b) determining means for determining from said operand data, concurrent with the issuance of a microcode control word by said sequencing means, whether said operand data is ideal with respect to said instruction, said determining means causing said selector means to select said second sequence of microcode control words for issuance to complete the processing of said operand data in response to said instruction when said operand data is ideal with respect to said instruction.

2. The instruction execution unit of claim 1 wherein said instruction is a floating point instruction, wherein said first sequence of microcode control words include microcode control words for detecting and controlling the occurrence of underflow and overflow conditions in the processing of non-ideal floating point instruction operand data and wherein said second sequence of microcode control words excludes microcode control words for detecting and controlling the occurrence of underflow and overflow conditions in the processing of floating point operand data associated with said instruction.

3. The unit of claim 2 wherein said sequencing means comprises:
(a) a control store including storage means for storing a sequence of microcode control word;
(b) a control store address register including means for receiving a selected address pointer from said selector means and for applying said address pointer to said storage means;
(c) a control word latch including means for receiving a control word corresponding to said address pointer; and
(d) primitive operator means, coupled to said control word latch for receiving said control word, for performing a corresponding floating point primitive point operation on said operand data, said control word identifying the one of a plurality of floating point primitive operation including non-ideal floating point primitive operations wherein the non-ideal condition of said operand data with respect to said instruction is detected, said primitive operator means performing each floating point primitive operation identified by a corresponding said control word in a respective machine cycle.

4. The unit of claim 3 wherein said selector means provides a branch address pointer to said control store address register, said selecting means, in response to the determination made by said determining means, enabling said receiving means of said control store address register to receive said branch address pointer.

5. The unit of claim 4 further comprising an ideal condition latch responsive to said determining means for storing a signal representative of the determination made by said determining means.

6. The unit of claim 5 wherein said selector means is connected to said ideal condition latch and responsive to the signal provided thereby.

7. The unit of claim 2 or 6 wherein said operand data includes two operands, each of said operands including an operand fraction having a plurality of digits and an operand exponent, said determining means comprises:
(a) first means for predicting the occurrence of an underflow, recomplement or zero condition from said operand data with respect to said instruction, said first means including:
(i) first logic means for detecting whether the operand fractions are added and whether the one of said operands with the larger magnitude is normalized;
(ii) second logic means for detecting whether the one of said operands with the larger magnitude is normalized, whether the operand exponents are unequal, and whether the larger operand exponent has a value of at least '10' Hex; and
(iii) third logic means for detecting whether the one of said operands with the larger magnitude is normalized, whether the leading digits of the operand fraction of each of said operands are unequal, and whether the larger operand exponent has a value of at least '10' Hex; and
(b) second means for predicting the occurrence of an overflow condition from said operand data with respect to said instruction, said second means including:
(i) fourth logic means for detecting whether the operand fractions are subtracted; and
(ii) fifth logic means for detecting whether both operand exponents have a value less than '7F' Hex.

8. The unit of claim 7 wherein said determining means further comprises:
(a) third means for predicting the occurrence of an underflow condition from said operand data with respect to said instruction, said third means including:
(i) sixth logic means for detecting whether both of said operands are normalized and whether the sum of the operand exponents is at least '41' Hex; and
(ii) seventh logic means for detecting whether the sum of the operand exponents is less than 'C0' Hex.

9. The unit of claim 8 wherein said determining means determines that said operand data is ideal with respect to said instruction when said instruction is a floating point addition or subtraction instruction and if said first, second or third logic means evaluates true and said fourth or fifth logic means evaluates true.

10. The unit of claim 8 wherein said determining means determines that said operand data is ideal with respect to said instruction when said instruction is a floating point multiplication instruction and if said sixth and seventh logic means evaluate true.

11. The unit of claim 8 wherein said instruction is also ideal if said instruction is also a floating point compare instruction and if said first, second, and third logic means evaluate true.

12. A method of operating a microcode programmed floating point execution unit comprising the steps of:
(a) obtaining a floating point instruction and its associated operand data;
(b) initiating the microcode programmed execution of said floating point instruction with respect to its associated operand data and concurrently determining whether said operand data is ideal with respect to said floating point instruction; and
(c) altering the microcode programmed execution of said floating point instruction during the execution thereof upon determining that said operand data is ideal with respect to said floating point instruction, such that non-ideal operand data testing and handling portions of the floating point microcode programmed instruction execution are skipped without interruption of the microcode programmed execution of said floating point instruction.

13. An instruction execution unit responsive to an instruction for processing operand data comprising:
(a) determining means for determining from said operand data whether said operand data is ideal with respect to said instruction;
(b) primitive operator means for performing a plurality of floating point primitive operations on said operand data including non-ideal primitive operations wherein non-ideal conditions are detected and dealt with, said primitive operator means performing each primitive operation in a respective machine cycle;
(c) sequencing means, responsive to said instruction, for controlling said primitive operator means to perform sequences, each sequence including a plurality of primitive operations in a respective plurality of said machine cycles, to execute said instruction and at least one of said sequences not including non-ideal primitive operations; and (d) selector means, connected to said sequencing means and responsive to said determining means, for selecting said one of said sequences not including non-ideal primitive operations whereby the number of machine cycles utilized in the execution of said instruction is reduced when said operand data is ideal with respect to said instruction.

14. An instruction execution unit responsive to an instruction for processing operand data comprising:
   (a) determining means for determining from said operand data whether said operand data is ideal with respect to said instruction;
   (b) primitive operator means for performing a plurality of floating point primitive operations on said operand data including non-ideal primitive operations wherein non-ideal conditions are detected and dealt with;
   (c) sequencing means, responsive to said instruction, for controlling said primitive operator means to perform sequences of primitive operations to execute said instruction and at least one of said sequences not including non-ideal primitive operations; and
   (d) selector means, connected to said sequencing means and responsive to said determining means, for selecting said one of said sequences not including non-ideal primitive operations whereby a shorter sequence is executed in the execution of said instruction when said operand data is ideal with respect to said instruction.

15. The unit of claim 14 wherein said primitive operator means performs each primitive operation in a respective machine cycle.

16. The unit of claim 14 wherein said determining means determines whether said operand data is ideal during the execution of said instruction.

17. A floating point execution unit, responsive to an instruction for processing operand data, comprising:
   (a) determining means for determining whether said operand data is ideal with respect to said instruction;
   (b) execution means for executing a sequence of primitive floating point computations on said operand data to perform said instruction, said primitive floating point computations selected from a set of primitive floating point computations including primitive floating point computations for detecting whether a computation exception condition occurs, said determining means operating prior to or concurrent with the first one of said sequence of primitive floating point computations executed by said execution means with respect to said instruction; and
   (c) sequencing means, responsive to said determining means, for controlling the sequential selection of primitive floating point computations for execution by said execution means, said sequencing means selecting an alternate sequence of said primitive floating point computations that excludes primitive floating point computations for detecting computation exception conditions to complete the execution of said instruction when said operand data is ideal, whereby fewer primitive floating point computations are required for processing ideal operand data in accordance with said instruction.

18. The execution unit of claim 17 wherein said determining means comprises logic means for testing said operand data to predict the occurrence of exponent underflow, overflow, recomplementing or a zero in the execution of said instruction such that said determining means determines that said operand data is ideal with respect to said instruction based on the predicted non-occurrence of exponent underflow, overflow, recomplementing or a zero in the execution of said instruction with respect to said operand data.

19. The floating point execution unit of claim 18 wherein said operand data includes two operands, each of said operands including an operand fraction having a plurality of digits and an operand exponent, and wherein said logic means determines said operand data to be ideal with respect to said instruction by determining:
   (a) whether said operand fractions are to be added and the one of said operands with the larger magnitude is normalized;
   (b) whether the one of said operands with the larger magnitude is normalized, said operand exponents are unequal and the one of said operands having the larger exponent has an exponent value of at least '10' Hex;
   (c) whether the one of said operands with the larger magnitude is normalized, the leading digits of said operand fractions are unequal, and said operand exponent having the larger exponent has an exponent value of at least '10' Hex;
   (d) whether the operand fractions are to be subtracted; and
   (e) whether both operand exponents have an exponent value of less than '7F' Hex.

20. The execution unit of claim 19 wherein said logic means further determines:
   (a) whether both of said operands are normalized and the sum of said operand exponents is at least '41' Hex; and
   (b) whether the sum of said operand exponents is less than 'C0' Hex.

* * * * *